US009312565B2

United States Patent
(12) United States Patent
Kim

(10) Patent No.: US 9,312,565 B2
(45) Date of Patent: Apr. 12, 2016

(54) RECHARGEABLE BATTERY

(75) Inventor: Duk-Jung Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 1204 days.

(21) Appl. No.: 13/244,261

(22) Filed: Sep. 23, 2011

(65) Prior Publication Data

US 2012/0315516 A1 Dec. 13, 2012

(30) Foreign Application Priority Data

Jun. 8, 2011 (KR) ........................ 10-2011-0055120

(51) Int. Cl.
*H01M 2/02* (2006.01)
*H01M 10/0525* (2010.01)

(52) U.S. Cl.
CPC ...... *H01M 10/0525* (2013.01); *H01M 2200/20* (2013.01); *H01M 2200/30* (2013.01); *Y02E 60/122* (2013.01)

(58) Field of Classification Search
CPC ...................................................... H01M 10/52
See application file for complete search history.

(56) References Cited

U.S. PATENT DOCUMENTS

| | | | | |
|---|---|---|---|---|
| 8,236,439 | B2 | 8/2012 | Byun et al. | |
| 2008/0081252 | A1* | 4/2008 | Miyazaki | 429/149 |
| 2010/0279156 | A1 | 11/2010 | Kim et al. | |
| 2011/0039136 | A1* | 2/2011 | Byun et al. | 429/56 |
| 2011/0052949 | A1* | 3/2011 | Byun et al. | 429/61 |
| 2011/0183198 | A1 | 7/2011 | Byun et al. | |

FOREIGN PATENT DOCUMENTS

| | | | |
|---|---|---|---|
| JP | 11-067161 | | 3/1999 |
| JP | 2011-18645 | A | 1/2011 |
| JP | 2011-54561 | A | 3/2011 |
| KR | 10-2006-0112745 | A | 11/2006 |
| KR | 10-2011-0017820 | A | 2/2011 |
| KR | 10-2011-0087566 | A | 8/2011 |

OTHER PUBLICATIONS

KIPO Notice of Allowance dated May 2, 2013 in priority KR Application 10-2011-0055120 (5 pages).
Machine translation for JP-11-067161, Mar. 9, 1999, 8 pages.

* cited by examiner

*Primary Examiner* — Jacob Marks

(74) *Attorney, Agent, or Firm* — Lewis Roca Rothgerber Christie LLP

(57) ABSTRACT

A rechargeable battery includes an electrode assembly having a first electrode and a second electrode; a case housing the electrode assembly; a cap plate coupled to the case; a short-circuit tab electrically coupled to the second electrode and having an opening; a short-circuit member electrically coupled to the first electrode and configured to be moved by a change in pressure to be electrically coupled to the short-circuit tab; and a cover covering the opening in the short-circuit tab.

7 Claims, 7 Drawing Sheets

RECHARGEABLE BATTERY

CROSS-REFERENCE TO RELATED APPLICATIONS

This application claims priority to and the benefit of Korean Patent Application No. 10-2011-0055120 filed in the Korean Intellectual Property Office on Jun. 8, 2011, the entire content of which is incorporated herein by reference.

BACKGROUND

1. Field

The described technology relates generally to a rechargeable battery.

2. Description of the Related Art

Unlike a primary battery that cannot be charged, a rechargeable battery can be repeatedly charged and discharged. A low capacity rechargeable battery is typically used for a portable small electronic device such as a mobile phone, a laptop computer, or a camcorder. A large capacity rechargeable battery is widely used as a power supply for driving a motor of a hybrid vehicle and the like.

Recently, a high-output rechargeable battery using a non-aqueous electrolyte solution of high energy density has been developed. The high-output rechargeable battery is configured of a large capacity battery module in which a plurality of rechargeable batteries are connected to each other in series to be used to drive a motor of devices requiring large power, for example, an electric car, or the like.

The battery module is configured by a plurality of rechargeable batteries that are generally coupled with each other in series, wherein each of the rechargeable batteries may be formed in a cylindrical shape, a square shape, and the like.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery having enhanced stability.

An exemplary embodiment provides a rechargeable battery including: an electrode assembly including a first electrode and a second electrode; a case receiving the electrode assembly; a cap plate combined with the case; a short-circuit tab electrically connected to the second electrode; a short-circuit member electrically connected to the first electrode and transformed according to a change in pressure to be electrically connected to the short-circuit tab; and a cover covering an opening formed in the short-circuit tab.

A sealing protrusion protruding towards the short-circuit tab to be inserted into the opening may be formed on the cover. An upper sealing member having elasticity may be formed on the external circumferential surface of the sealing protrusion.

A protruding sealing rib extending along the circumferential direction of the opening may be formed around the opening. An upper insulating member may be provided between the short-circuit tab and the cap plate, a first fixing portion to be insertion-combined with the upper insulating member may be formed on a sidewall of the cover, and a second fixing portion to be insertion-combined with the first fixing portion may be formed on the upper insulating member.

The first fixing portion may be formed of protrusions and the second fixing portion is formed of grooves. A provisional combining portion to be insertion-combinable with the first fixing portion may be formed in an upper portion of the second fixing portion.

A first protrusion that is spaced apart from the first fixing portion and is formed of a wedge shape may be formed on the cover, and a first groove with the first protrusion may be formed on an upper insulating member. A second protrusion having a longitudinal section in an arc shape may be formed on a corner of the cover, and a second groove to be inserted with the second protrusion may be formed on an upper insulating member.

A lower sealing member extending along the circumferential direction of a short-circuit hole in which the short-circuit member is installed may be provided between the cap plate and the short-circuit tab. A groove may be formed on the top surface of the short-circuit tab, a first protrusion protruding towards the short-circuit tab may be formed on the cover, and an upper sealing member may be provided between the groove and the first protrusion.

A hole extending to a lower portion of the cover may be formed in the groove, and a second protrusion that protrudes towards the lower portion and is inserted into the hole may be formed on the first protrusion. A short-circuit hole inserted with the short-circuit member may be formed in the cap plate, and a protrusion protruding towards the short-circuit member may be formed on the short-circuit tab, and a lower sealing member may be provided between the internal side of the short-circuit hole and the external side of the protrusion.

A terminal electrically connected to the second electrode may be mounted to the cap plate, the short-circuit tab may be integrally formed with the terminal, a short-circuit hole inserted with the short-circuit member may be formed in the cap plate, and the short-circuit tab may extend to the short-circuit hole. A protrusion protruding towards the short-circuit hole may be formed on the short-circuit tab.

According to exemplary embodiments, since an opening is formed in a short-circuit tab and a cover covering the opening is provided, it is possible to prevent or reduce a likelihood of a malfunction of a short-circuit member located in a lower portion by opening or closing the opening.

DETAILED DESCRIPTION

Figure 1:
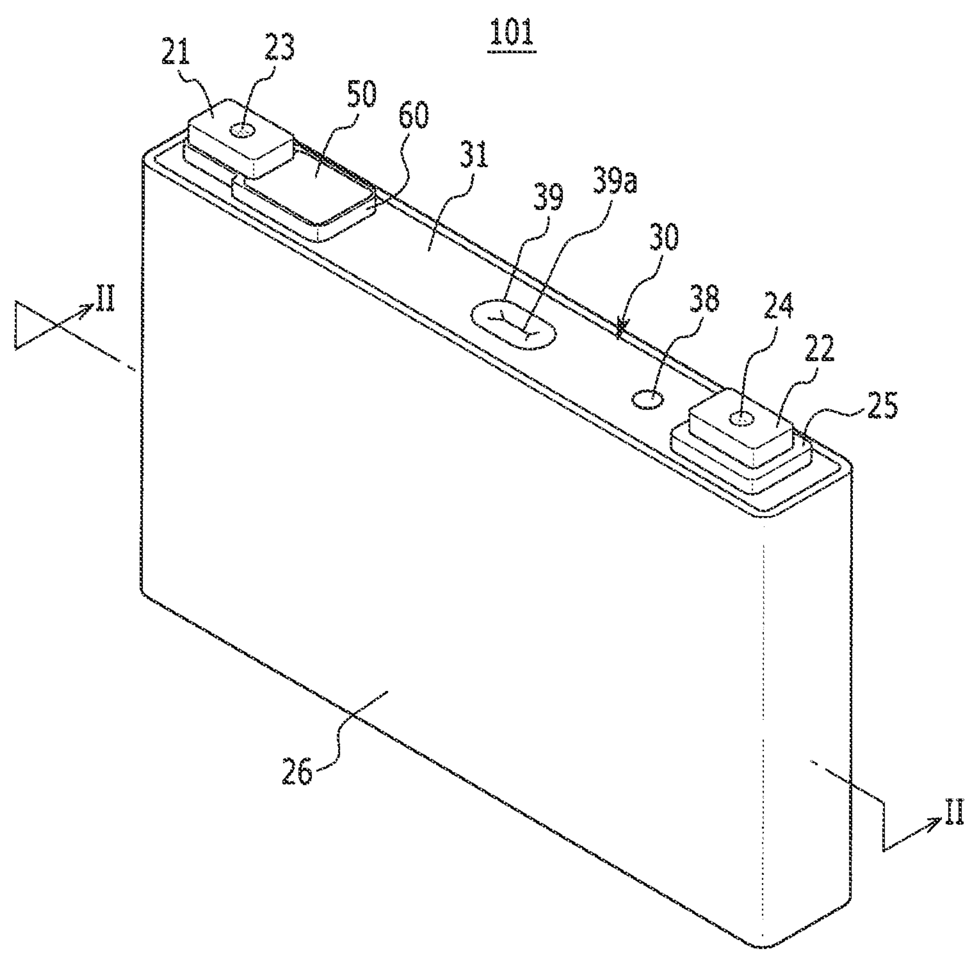
FIG. 1 is a perspective view illustrating a rechargeable battery according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like reference numerals designate like elements throughout the specification and the drawings.

Figure 2:
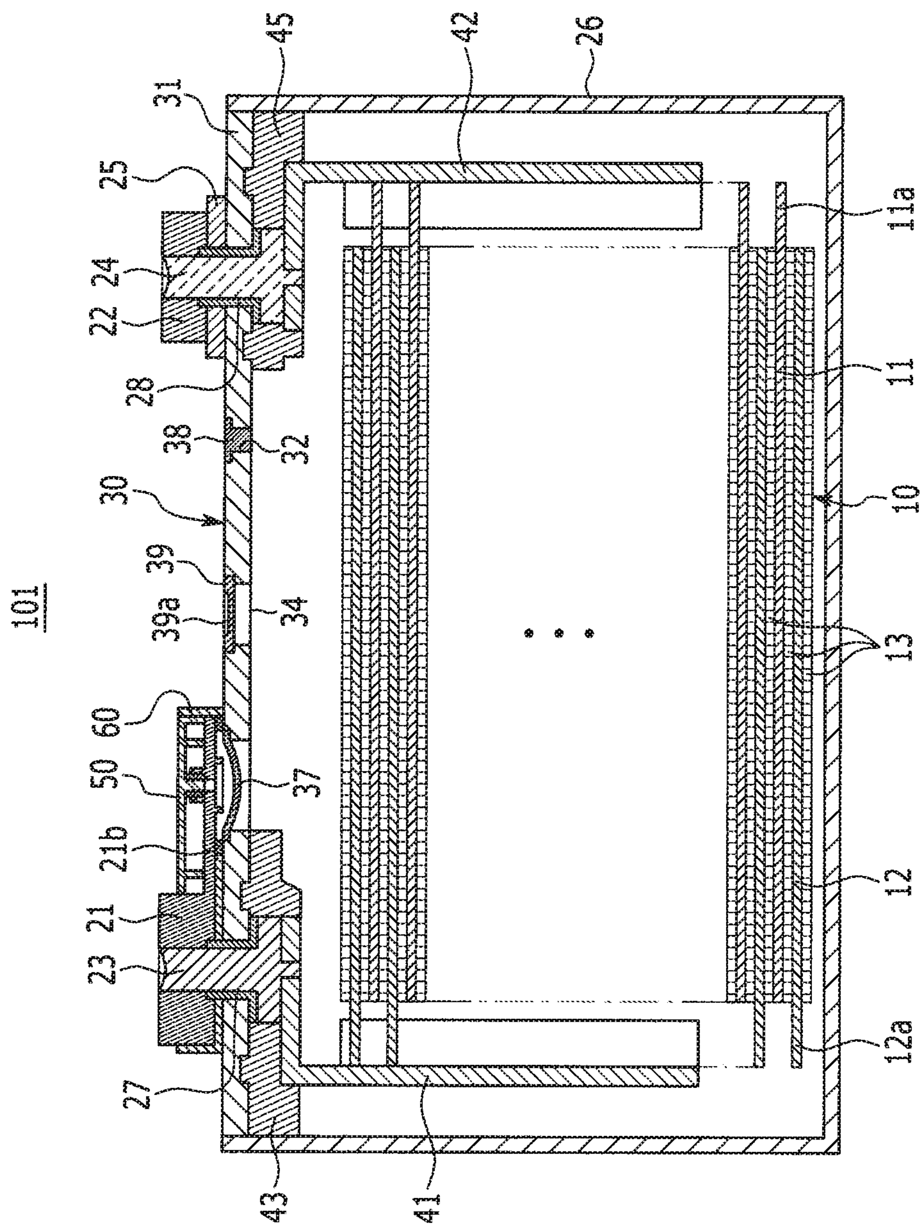
FIG. 2 is a cross-sectional view taken along a line II-II of FIG. 1.

FIG. 1 is a perspective view illustrating a rechargeable battery 101 according to a first exemplary embodiment of the present invention, and FIG. 2 is a cross-sectional view taken along a line II-II of FIG. 1.

Referring to FIGS. 1 and 2, the rechargeable battery 101 according to the first exemplary embodiment includes an electrode assembly 10 wound with a separator 13 located between a first electrode 11 and a second electrode 12, a case 26 embedded with and housing the electrode assembly 10, and a cap assembly 30 combined with an opening of the case 26.

The rechargeable battery 101 according to the first exemplary embodiment will be described by taking a lithium ion rechargeable battery in a square shape as an example. However, the present invention is not limited thereto and the present invention may be applied to various types of batteries such as a lithium polymer battery, a cylindrical battery, and the like.

The first electrode 11 and the second electrode 12, each includes a coating region where an active material is coated on a current collector formed of a thin metal foil, and uncoated regions 11*a* and 12*a* where the active material is not coated. In the exemplary embodiment, the first electrode 11 corresponds to a positive electrode and the second electrode 12 corresponds to a negative electrode. However, the present invention is not limited thereto and the first electrode 11 may correspond to the negative electrode and the second electrode 12 may correspond to the positive electrode.

The uncoated region 11*a* of the first electrode 11 is formed on one side end of the first electrode 11 along the lengthwise direction of the first electrode 11, and the uncoated region 12*a* of the second electrode 12 is formed on the other side end of the second electrode 12 along the lengthwise direction of the second electrode 12. The first electrode 11 and the second electrode 12 are wound after interposing an insulator, that is, the separator 13 therebetween.

However, the present invention is not limited thereto and the electrode assembly 10 may be configured as a structure in which the first electrode and the second electrode formed by a plurality of sheets are layered with the separator located therebetween.

The case 26 is formed in an approximate cuboidal shape, and an opening is formed on one side of the case 26. The case 26 may be formed of a metal such as aluminum, stainless steel, and the like.

The cap assembly 30 includes a cap plate 31 covering the opening of the case 26, a first terminal 22 that protrudes towards the outside of the cap plate 31 and is electrically connected to the first electrode 11, and a second terminal 21 that protrudes towards the outside of the cap plate 31 and is electrically connected to the second electrode 12.

The cap plate 31 is formed in an elongated plate shape and is combined with the opening of the case 26. A sealing stopper 38 provided to an electrolyte injection opening 32 and a vent plate 39 are mounted to the cap plate 31. Here, the vent plate 39 is provided to a vent hole 34 and is formed with a notch 39*a* to be opened at a predetermined pressure. Also, a short-circuit hole is formed in the cap plate 31 and a short-circuit member 37 that is transformed according to a change in internal pressure of the case 26 is mounted to the short-circuit hole. The short-circuit member 37 is provided in the shape of a plate spring so that it can be transformed or moved due to a change in pressure, and includes an edge portion and a protruding variable portion that is curved in an arch shape with respect to the edge portion.

The first terminal 22 is electrically connected to the first electrode 11 through a current collecting tab 42, and the second terminal 21 is electrically connected to the second electrode 12 through a current collecting tab 41. However, the present invention is not limited thereto and the first terminal 22 may be electrically connected to the second electrode and the second terminal 21 may be electrically connected to the first electrode.

The first terminal 22 is provided in the shape of an approximate square plate and is electrically connected to the current collecting tab 42 through a connecting terminal 24. An upper end of the connecting terminal 24 is fixed to the first terminal 22 by welding and a lower end of the connecting terminal 24 is fixed to the current collecting tab 42 by welding.

A gasket 28 for sealing is provided between the first terminal 22 and the cap plate 31 to be inserted into a hole through which a terminal passes, and a lower insulating member 45 insulating the connecting terminal 24 and the current collecting tab 42 from the cap plate 31 is located below the cap plate 31.

A connecting plate 25 electrically connecting the first terminal 22 and the cap plate 31 is provided between the first terminal 22 and the cap plate 31. Accordingly, the cap plate 31 can be positively charged.

The second terminal 21 is provided in the shape of an approximate square plate and is electrically connected to the current collecting tab 41 through a connecting terminal 23. An upper end of the connecting terminal 23 is fixed to the second terminal 21 by welding and a lower end of the connecting terminal 23 is fixed to the current collecting tab 41 by welding.

A gasket 27 for sealing is provided between the second terminal 21 and the cap plate 31 to be inserted into a hole through which the second terminal 21 passes, and a lower insulating member 43 insulating the second terminal 21 and the current collecting tab 41 from the cap plate 31 is located below the cap plate 31.

An upper insulating member 60 for insulation is provided between the second terminal 21 and the cap plate 31.

Figure 3:
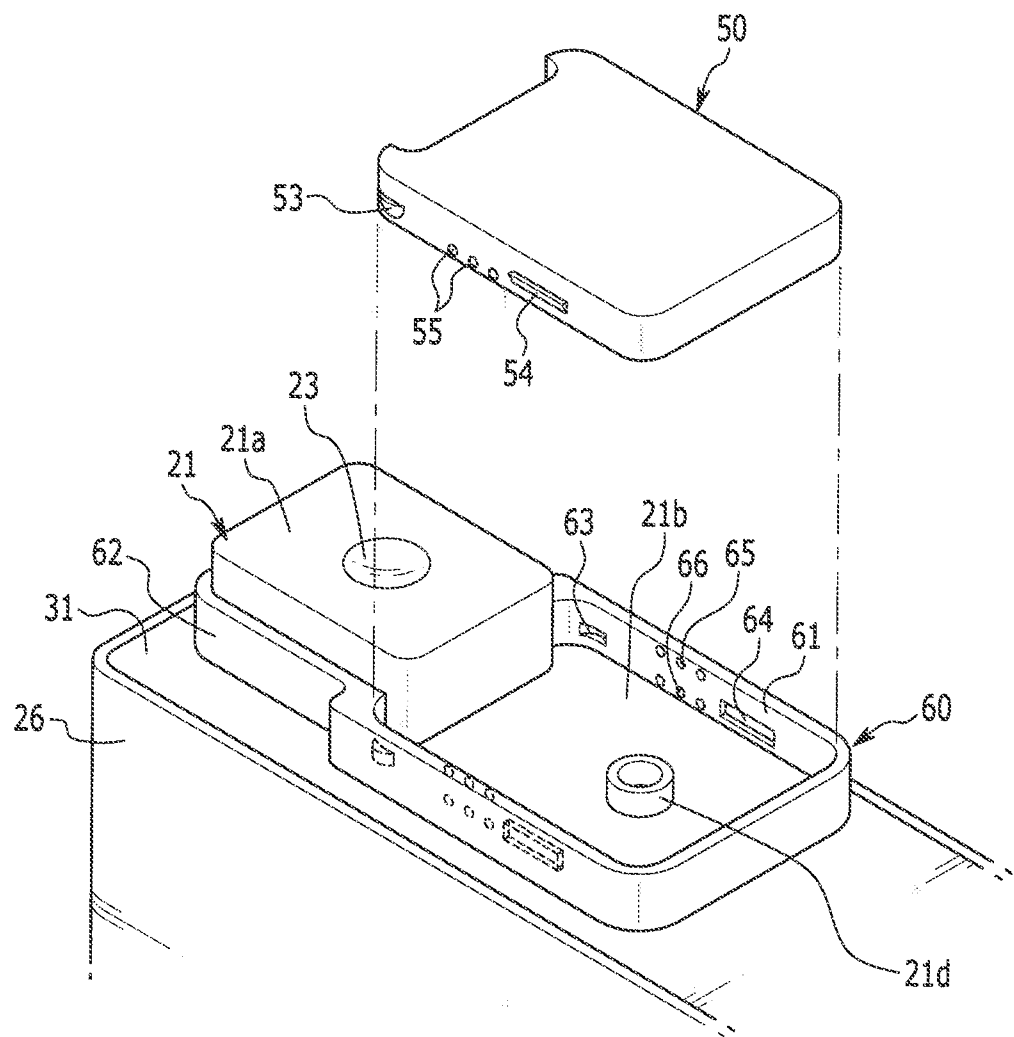
FIG. 3 is an exploded perspective view illustrating a portion of the rechargeable battery of FIG. 1.
Figure 4:
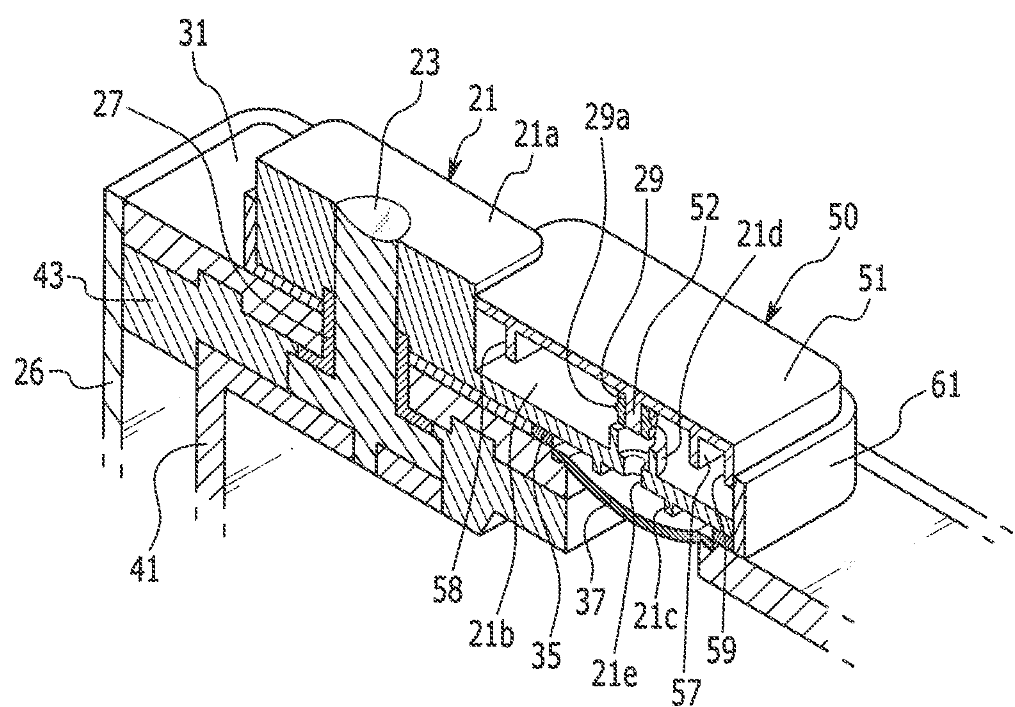
FIG. 4 is a cut perspective view illustrating a cover being provisionally combined with the rechargeable battery of FIG. 1.

FIG. 3 is an exploded perspective view illustrating a part of the rechargeable battery 101 according to the first exemplary embodiment of the present invention, and FIG. 4 is a cut perspective view illustrating a state where a cover 50 is provisionally combined with the rechargeable battery 101 according to the first exemplary embodiment of the present invention.

Referring to FIGS. 3 and 4, the second terminal 21 includes a terminal portion 21*a* formed of a square pillar and a short-circuit tab 21*b* fixed to the terminal portion 21*a*. Even though the short-circuit tab 21*b* is integrally formed with the second terminal 21 as an example in the exemplary embodiment, the present invention is not limited thereto and thus, the short-circuit tab 21*b* may be fixed to the second terminal 21 by welding and the like.

The short-circuit tab 21*b* is provided in a planar shape and is provided to cover the short-circuit hole. An opening 21*e* connecting with the short-circuit hole is formed in the short-circuit tab 21*b*, and a protrusion 21*c* protruding towards the short-circuit member 37 is formed on the bottom of the short-circuit tab 21*b*. The protrusion 21*c* is formed around the opening 21*e* and has a circular cross-section. Meanwhile, a protruding sealing rib 21*d* elongated along the circumferential direction of the opening 21*e* is formed on the top of the short-circuit tab 21*b*.

When the internal pressure of the case 26 increases, the short-circuit member 37 is transformed or moved such that the protrusion 21*c* of the short-circuit tab 21*b* and the short-circuit member 37 are electrically connected to each other. In that case, the short-circuit tab 21*b* is electrically connected to the negative electrode and the short-circuit member 37 is electrically connected to the positive electrode. Therefore, the positive electrode and the negative electrode are electrically connected to each other such that charged current is discharged and it is possible to prevent the explosion of the rechargeable battery 101.

The cover 50 is provided above the short-circuit tab 21*b* and the cover 50 is combined with an upper insulating member 60. A first fixing portion 55 protruding from a lower portion of one side of the cover 50, a first protrusion 54 that is spaced from the first fixing portion 55 and is formed of a wedge shape, and a second protrusion 53 that is formed in a corner portion towards the terminal portion 21*a* are formed on the cover 50. Even though the fixing portion 55 is formed of a protrusion as an example in the exemplary embodiment, the present invention is not limited thereto. The first fixing portion 55 may be formed of an insertion-combinable groove that is configured to be coupled with a corresponding member.

A plurality of first fixing portions 55 is formed on the cover 50 and thus, the first fixing portion 55 is provided in a partial spherical shape and is positioned in the lower portion of the side of the cover 50.

The first protrusion 54 extends along the side surface of the cover 50, and has a longitudinal section in a wedge shape. The first protrusion 54 is formed to have a protruding height gradually increased from the lower portion of the cover 50 to an upper portion of the cover 50. The second protrusion 53 is for formed on a front corner of the cover 50 and has a longitudinal section in an arc shape. The second protrusion 53 is also formed to have a protruding height gradually increased from the lower portion of the cover 50 to the upper portion of the cover 50.

A sealing protrusion 52 protruding towards the short-circuit tab 21*b* to be inserted into the sealing rib 21*d* is formed on the bottom of the cover 50, and an upper sealing member 29 formed of an elastic material is provided to the circumference of the sealing protrusion 52. The upper sealing member 29 is attached to the external circumferential surface of the sealing protrusion 52, and a protrusion 29*a* protrudes around a periphery of the upper sealing member 29. Accordingly, when the sealing protrusion 52 is inserted into the sealing rib 21*d*, the upper sealing member 29 closely contacts the sealing protrusion 52 and the sealing rib 21*d* to stably seal the opening 21*e*.

Also, support ribs 57, 58, and 59 protruding towards the short-circuit tab 21*b* are formed on the cover 50, and the support ribs 57, 58, and 59 contact the short-circuit tab 21*b* to support the cover 50.

The upper insulating member 60 includes a bottom portion located below the second terminal 21, a first sidewall 62 surrounding the terminal portion 21*a*, and a second sidewall 61 surrounding the cover 50. A provisional combining portion 65 primarily insertion-combined with the first fixing portion 55 and a second fixing portion 66 that passes the provisional combining portion 65 to be insertion-combined with the first fixing portion 55 are formed on the second sidewall 61. The provisional combining portion 65 and the second fixing portion 66 are formed of grooves. The provisional combining portion 65 is formed in an upper portion of the second sidewall 61 and the second fixing portion 66 is formed in the lower portion of the second sidewall 61. Accordingly, when the cover 50 is provisionally combined, the first fixing portion 55 is inserted into the provisional combining portion 65. When the cover 50 is completely combined, the first fixing portion 55 is inserted into the second fixing portion 66. In one embodiment, a first groove 64 inserted with the first protrusion 54 and a second groove 63 inserted with the second protrusion 53 are formed on the upper insulating member 60. Accordingly, the cover 50 may be stably combined with the upper insulating member 60 through combination between the protrusions 53 and 54 and the grooves 63 and 64.

A lower sealing member 35 extending along the short-circuit hole and formed of a ring shape is provided between the cap plate 31 and the short-circuit tab 21*b*. Accordingly, it is possible to stably seal the space between the short-circuit tab 21*b* and the cap plate 31.

Figure 5:
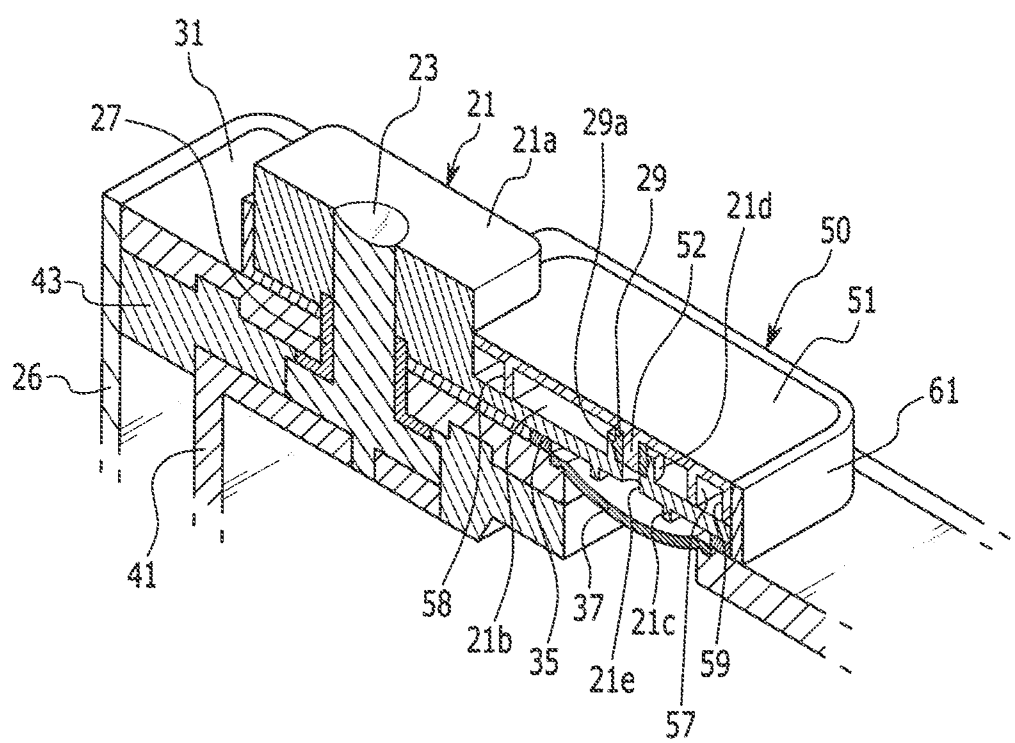
FIG. 5 is a cut perspective view illustrating a state where the cover is completely combined with the rechargeable battery of FIG. 1.

As shown in FIG. 4, when the first fixing portion 55 is insertion-combined or coupled to the provisional combining portion 65, the sealing protrusion 52 is not inserted into the sealing rib 21*d* and thus, the opening 21*e* is not sealed. As shown in FIG. 5, when the first fixing portion 55 is insertion-combined with or coupled to the second fixing portion 66, the sealing protrusion 52 is inserted into the sealing rib 21*d* to stably seal the opening 21*e*. Accordingly, by inserting the first fixing portion 55 into the provisional combining portion 65 or the second fixing portion 66 depending on external environments, it is possible to open or seal the opening 21*e* formed in the short-circuit tab 21*b*.

As described above, according to the exemplary embodiment, even when the external pressure changes, for example, when the external pressure decreases due to air transportation and the like, it is possible to stably prevent a malfunction of the short-circuit member 37. When the internal pressure of the rechargeable battery 101 elevates, it is possible to operate the short-circuit member 37 at a set pressure.

Figure 6:
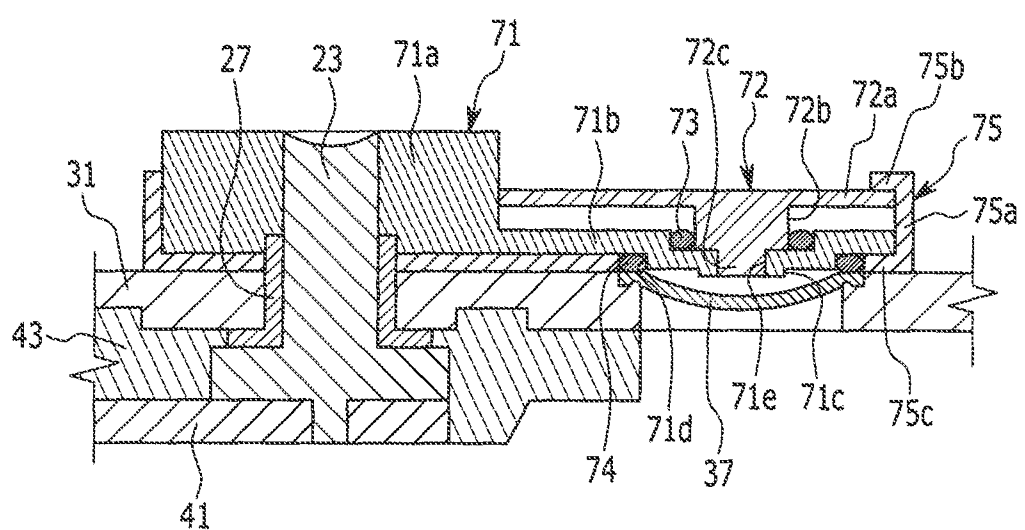
FIG. 6 is a partial cross-sectional view illustrating a rechargeable battery according to a second exemplary embodiment of the present invention.

FIG. 6 is a partial cross-sectional view illustrating a rechargeable battery according to a second exemplary embodiment of the present invention.

Referring to FIG. 6, the rechargeable battery according to the exemplary embodiment is configured to be the same as the rechargeable battery 101 according to the first exemplary embodiment, except for the structure of a second terminal 71, a cover 72, and an upper insulating member 75 and thus, repeating description related to the same structure will be omitted.

The second terminal 71 includes a terminal portion 71*a* provided in a rectangular shape and a short-circuit tab 71*b* fixed to a lower end of the terminal portion 71*a*. Even though the short-circuit tab 71*b* is integrally formed with the second terminal 71 as an example in the exemplary embodiment, the present invention is not limited thereto. The short-circuit tab may be fixed to the second terminal by welding and the like.

The short-circuit tab 71*b* is formed of a planar shape and is located to cover a short-circuit hole. A hole 71*e* connected with the short-circuit hole is formed in the short-circuit tab 71*b*, a first protrusion 71*d* protruding towards the short-circuit member 37 is formed on the bottom of the short-circuit tab 71*b*, and a second protrusion 71*c* further protruding than the first protrusion 71*d* is formed on the first protrusion 71*d*. The second protrusion 71*c* is formed on the hole 71*e* and a groove is formed on the top surface of the first protrusion 71*d*.

The cover 72 is provided above the short-circuit tab 71*b*, and the cover 72 includes an upper plate 72*a*, a first protrusion

72*b* protruding from the upper plate 72*a* towards the short-circuit tab 71*b* be inserted into a groove, and a second protrusion 72*c* protruding downward from the first protrusion 72*b* to be inserted into the hole 71*e*.

An upper sealing member 73 is provided on the external circumferential surface of the first protrusion 72*b*. When the first protrusion 72*b* is inserted into the groove, the upper sealing member 73 may closely contact with the first protrusion 72*b* and the groove to stably seal the hole 71*e*. The upper sealing member 73 has a thickness direction and a height direction, and the upper sealing member 73 is pressurized in the thickness direction.

An upper insulating member 75 includes a bottom portion located below the second terminal 71, a sidewall 75*a* surrounding the second terminal 71, and a support portion 75*b* protruding inward from an upper end of the sidewall 75*a*.

The support portion 75*b* is formed to extend along the sidewall 75*a* and contacts the top surface of the cover 72 to fix the cover 72.

A lower sealing member 74 extending along the short-circuit hole and formed of a ring shape is provided between the bottom portion and the first protrusion 71*d*. Accordingly, it is possible to stably seal the space between the short-circuit tab 71*b* and the cap plate 31. The lower sealing member 74 has a thickness direction and a height direction, and the lower sealing member 74 is pressurized in the thickness direction.

Figure 7:
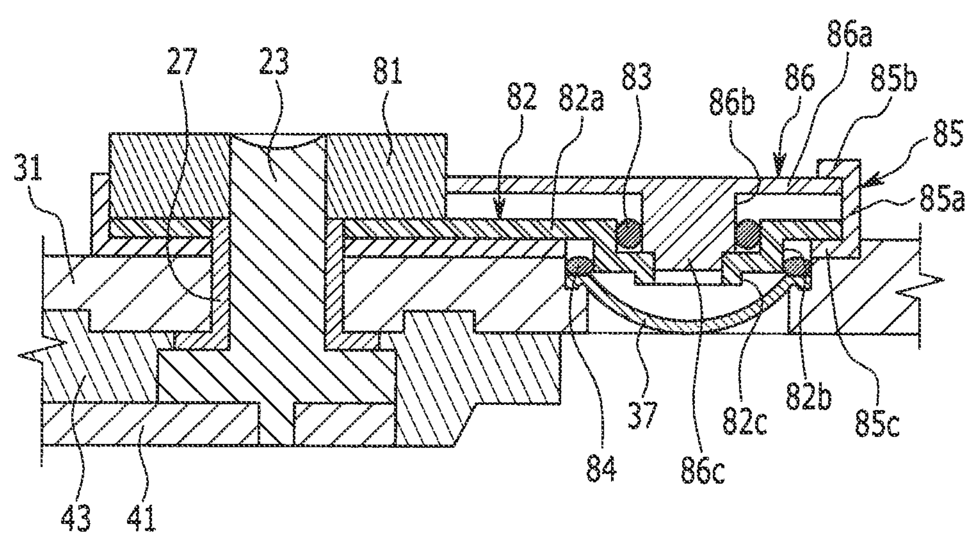
FIG. 7 is a partial cross-sectional view illustrating a rechargeable battery according to a third exemplary embodiment of the present invention.

FIG. 7 is a partial cross-sectional view illustrating a rechargeable battery according to a third exemplary embodiment of the present invention.

Referring to FIG. 7, a rechargeable battery according to the exemplary embodiment is configured to be the same as the rechargeable battery 101 according to the first exemplary embodiment, except for the structure of a second terminal 81, a cover 86, and an upper insulating member 85 and thus, repeating description related to the same structure will be omitted.

The second terminal 81 is provided in the shape of a square pillar and a short-circuit tab 82 in a planar shape is provided below the second terminal 81. The short-circuit tab 82 is electrically connected to the second terminal 81, and extends below the second terminal 81 to a short-circuit hole, to thereby cover the short-circuit hole. A hole connected with the short-circuit hole is formed in the short-circuit tab 82, a first protrusion 82*b* protruding towards the short-circuit member 37 is formed on the bottom of the short-circuit tab 82, and a second protrusion 82*c* further protruding than the first protrusion 82*b* is formed on the first protrusion 82*b*. A hole is formed in the second protrusion 82*c* and a groove is formed on the top surface of the first protrusion 82*b*.

The cover 86 is provided above the short-circuit tab 82, and the cover 86 includes an upper plate 86*a*, a first protrusion 86*b* protruding from the upper plate 86*a* towards the short-circuit tab 82 to be inserted into the groove, and a second protrusion 86*c* protruding downward from the first protrusion 86 to be inserted into the hole.

An upper sealing member 83 is provided on the external circumferential surface of the first protrusion 86*b*. When the first protrusion 86*b* is inserted into the groove, the upper sealing member 83 may closely contact the first protrusion 86*b* and the groove, to thereby stably seal the hole. The upper sealing member 83 has a thickness direction and a height direction, and the upper sealing member 83 is pressurized in the thickness direction.

An upper insulating member 85 includes a bottom portion located below the second terminal 81, a sidewall 85*a* surrounding the second terminal 81, and a support portion 85*b* protruding inward from an upper end of the sidewall 85*a*.

The support portion 85*b* is formed to extend along the sidewall 85*a* and contacts the top surface of the cover 86 to fix the cover 86.

A lower sealing member 84 extending along the short-circuit hole and formed of a ring shape is provided between the cap plate 31 and the first protrusion 82*b*. Accordingly, it is possible to stably seal the space between the short-circuit tab 82 and the cap plate 31. The lower sealing member 84 has a thickness direction and a height direction, and the lower sealing member 84 is pressurized in the thickness direction.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| 101: Rechargeable battery | 10: Electrode assembly |
| 11: First electrode | 12: Second electrode |
| 13: Separator | 21: Second terminal |
| 22: First terminal | 21a: Terminal portion |
| 21b: Short-circuit tab | 21c: Protrusion |
| 21d: Sealing rib | 21e: Hole |
| 23, 24: Connecting terminal | 25: Connecting plate |
| 26: Case 27 | 28: Gasket |
| 29: Upper sealing member | 29a: Protrusion |
| 30: Cap assembly | 31: Cap plate |
| 32: Electrolyte injection opening | 35: Lower sealing member |
| 37: Short-circuit member | 38: Sealing stopper |
| 34: Vent hole | 39: Vent plate |
| 41, 42: Current collecting tab | 43: Lower insulating member |
| 45: Lower insulating member | 50: Cover |
| 52: Sealing protrusion | 54: First protrusion |
| 53: Second protrusion | 55: First fixing portion |
| 60: Upper insulating member | 61: Second sidewall |
| 62: First sidewall | 64: First groove |
| 63: Second groove | 65: Provisional combining portion |
| 66: Second fixing portion | |

What is claimed is:

1. A rechargeable battery comprising:

an electrode assembly comprising a first electrode and a second electrode;

a case housing the electrode assembly;

a cap plate coupled to the case;

a short-circuit tab electrically coupled to the second electrode, the short-circuit tab having an opening and a protrusion extending towards the electrode assembly;

a short-circuit member electrically coupled to the first electrode and configured to be moved by a change in pressure to be electrically coupled to the short-circuit tab;

a cover covering the opening in the short-circuit tab; and an upper insulating member located between the short-circuit tab and the cap plate, a first fixing portion configured to be coupled to the upper insulating member on a sidewall of the cover, and a second fixing portion configured to be coupled to the first fixing portion on the upper insulating member.

2. The rechargeable battery of claim 1, wherein the first fixing portion comprises protrusions and wherein the second fixing portion comprises grooves.

3. The rechargeable battery of claim 1, further comprising a provisional combining portion configured to be coupled to the first fixing portion in an upper portion of the second fixing portion.

4. The rechargeable battery of claim 1, further comprising a wedge-shaped first protrusion spaced from the first fixing portion on the cover, and a first groove accommodating the first fixing portion on an upper insulating member.

5. A rechargeable battery comprising:

an electrode assembly comprising a first electrode and a second electrode;

a case housing the electrode assembly;

a cap plate coupled to the case;

a short-circuit tab electrically coupled to the second electrode, the short-circuit tab having an opening and a protrusion extending towards the electrode assembly;

a short-circuit member electrically coupled to the first electrode and configured to be moved by a change in pressure to be electrically coupled to the short-circuit tab;

a cover covering the opening in the short-circuit tab; and a groove on a top surface of the short-circuit tab, a first protrusion on the cover and protruding towards the short-circuit tab, and an upper sealing member located between the groove and the first protrusion.

6. The rechargeable battery of claim 5, further comprising an opening extending to a lower portion of the cover in the groove and a second protrusion protruding towards the lower portion and within the opening on the first protrusion.

7. The rechargeable battery of claim 5, further comprising a short-circuit opening within the short-circuit member in the cap plate, a protrusion protruding towards the short-circuit member on the short-circuit tab, and a lower sealing member located between an internal side of the short-circuit opening and an external side of the protrusion.

* * * * *